United States Patent [19]

Yokota et al.

[11] Patent Number: 5,609,793
[45] Date of Patent: Mar. 11, 1997

[54] FLUORESCENT SUBSTANCE, METHOD FOR PRODUCTION THEREOF, RADIATION DETECTOR USING THE FLUORESCENT SUBSTANCE, AND X-RAY CT APPARATUS USING THE RADIATION DETECTOR

[75] Inventors: Kazuto Yokota; Yukihiro Fukuta, both of Yokohama, Japan

[73] Assignee: Kabushiki Kaisha Toshiba, Kanagawa-ken, Japan

[21] Appl. No.: 362,004

[22] Filed: Dec. 22, 1994

[30] Foreign Application Priority Data

Dec. 27, 1993 [JP] Japan .................................. 5-332733

[51] Int. Cl.$^6$ .................................................. C09K 11/00
[52] U.S. Cl. .................. 252/301.4 S; 423/263; 423/518
[58] Field of Search ............... 252/301.4 S; 423/263, 423/518

[56] References Cited

U.S. PATENT DOCUMENTS

| | | | |
|---|---|---|---|
| 3,502,590 | 3/1970 | Royce et al. | 252/301.4 S |
| 4,863,882 | 9/1989 | Matsuda et al. | 501/94 |
| 5,296,163 | 3/1994 | Leppert et al. | 252/301.4 S |

FOREIGN PATENT DOCUMENTS

| | | |
|---|---|---|
| 0533316 | 3/1993 | European Pat. Off. . |
| 58-204088 | 11/1983 | Japan . |
| 59-27283 | 2/1984 | Japan . |
| 3243686 | 10/1991 | Japan . |
| 3-243686 | 10/1991 | Japan .................. 252/301.4 S |

OTHER PUBLICATIONS

Chemical Abstract citation: 88:82738a, Kubo et al, Oct. 1, 1977.

"Section I. Basic Principles of Computed Tomography Detectors", Haque et al Radiology of the Skull and Brain, 5:4097–4130 (1980) no month.

"Study on Optical Properties of Ceramics Scintillator for X–Ray CT Equipment (Part 1 )", Nakamura et al., Journal of the Ceramic Society of Japan, 101(10):115–119 (1993) no month.

"Ceramic Scintillators for Advanced, Medical X–Ray Detectors", Greskovich et al., American Ceramic Society Bulletin, 71(7):1120 (1992) Jul.

"Recent Developments in Scintillation Detectors For X–Ray CT and Positron CT Applications", M. R. Farukhi, IEEE Trans. Nucl. Sci., NS–29, (1982) no month.

*Primary Examiner*—Melissa Bonner
*Attorney, Agent, or Firm*—Finnegan, Henderson, Farabow, Garrett & Dunner, L.L.P.

[57] ABSTRACT

A fluorescent substance is comprised of a rare earth oxysulfide represented by the chemical formula, $R_{2(1-x)}Pr_{2x}O_2S$, wherein R stands for at least one member selected from the group consisting of Y, Gd, La, and Lu and x for a numerical value satisfying the expression, $5 \times 10^{-5} \leq x \leq 1 \times 10^{-2}$, and has a linear absorption coefficient of not more than 6.0 cm$^{-1}$ at 550 nm. And further fluorescent substance contains $PO_4$ in an amount of not more than 100 ppm.

8 Claims, 2 Drawing Sheets

FLUORESCENT SUBSTANCE, METHOD FOR PRODUCTION THEREOF, RADIATION DETECTOR USING THE FLUORESCENT SUBSTANCE, AND X-RAY CT APPARATUS USING THE RADIATION DETECTOR

BACKGROUND OF THE INVENTION

1. Field of the Invention

This invention relates to a fluorescent substance of a Pr-activated rare earth oxysulfide, a method for the production thereof, a radiation detector using the fluorescent substance, and an X-ray CT apparatus. More particularly, this invention relates to a Pr-activated rare earth oxysulfide fluorescent substance possessed of an exalted capacity for light emission, a method for the production thereof, a radiation detector using the fluorescent substance, and an X-ray CT apparatus using the radiation detector.

2. Description of the Related Art

Heretofore, the practice of conducting a nondestructive inspection of a body under test by means of X-ray CT has been in vogue particularly in the medical field and the industrial field. In the X-ray CT apparatus to be employed for this inspection, the detector which utilizes a scintillator is used for detecting the radiation transmitted through a given body. The scintillator is a substance which, on being stimulated as by the X ray, emits a visible radiation or electromagnetic waves of a wavelength approximating that of a visible radiation. As materials usable effectively for this scintillator, single crystals such as NaI, CsI, and $CdWO_4$, ceramics such as $BaFCl:Eu$, $LaOBr:Tb$, $CsI:Tl$, $CaWO_4$, and $CdWO_4$, the cubic rare earth oxide ceramics disclosed in JP-A-59-27,283, and the rare earth oxysulfide ceramics such as $Gd_2O_2S:Pr$ disclosed in JP-A-58-204,088 have been known.

Among materials for the scintillator mentioned above, the rare earth oxysulfide ceramics such as $Gd_2O_2S:Pr$ prove to be particularly suitable because of high luminous efficiency. The sulfidizing agent which is mixed with a rare earth oxide powder and the alkali metal salt of phosphoric acid which is used as a flux chiefly persist in the fluorescent substance and impede the improvement of the light transmission property of the rare earth oxysulfide ceramics.

For the purpose of solving this problem, JP-A-03-243,686, for example, discloses an invention which is aimed at enabling a fluorescent substance to retain a necessary sintering property intact and acquire improved crystallinity and light transmission property by limiting within specific ranges the amounts of alkali metals and phosphorus persisting in the fluorescent substance.

The fluorescent substance which is obtained as disclosed in JP-A-03-243,686, however, is still deficient in luminous emission intensity and is in need of further improvement.

SUMMARY OF THE INVENTION

This invention has for an object thereof the provision of a fluorescent substance possessed of improved luminous emission intensity as compared with the conventional rare earth oxysulfide fluorescent substance which is deficient in luminous emission intensity and a method for the production of the fluorescent substance.

Another object of this invention is to provide a radiation detector using the fluorescent substance and an X-ray CT apparatus using the radiation detector.

The fluorescent substance of this invention is a rare earth oxysulfide which is represented by the chemical formula, $R_{2(1-x)}Pr_{2x}O_2S$ and is further characterized by exhibiting a linear absorption coefficient of not more than 6.0 $cm^{-1}$ at a wavelength of 550 nm. In the formula mentioned above, R stands for at least one member selected from the group consisting of Y, Gd, La, and Lu and x for a numerical value satisfying the expression $5 \times 10^{-5} \leq x \leq 1 \times 10^{-2}$.

As the rare earth element R, at least one member selected from the group consisting of Y (yttrium), Gd (gadolinium), La (lanthanum), and Lu (lutetium) can be used. Among rare earth elements cited above, Gd especially exhibits a large X-ray absorption coefficient which adapts this element particularly for use in a radiation detector.

The reason for using Pr as an activating agent in this fluorescent substance is that this activating agent has a small afterglow as compared with such known activating agents as Tb and Eu and, therefore, is particularly suitable for use in a radiation detector.

The reason for confining the numerical value of x within the range of $5 \times 10^{-5} \leq x \leq 1 \times 10^{-2}$ is that the luminous emission intensity depends on the concentration of Pr and the fluorescent substance will not manifest a fully satisfactory luminous emission intensity if this numerical value falls outside the range.

This range is desired to be $5 \times 10^{-5} \leq x \leq 5 \times 10^{-3}$, preferably to be $1 \times 10^{-4} \leq x \leq 3 \times 10^{-3}$.

The reason for limiting the linear absorption coefficient to that at a wavelength of 550 nm is that the magnitude of the absorption coefficient at this specific wavelength is not readily affected by the addition of Pr, since some sintered ceramics may be prevented from exhibiting a satisfactory luminous emission intensity by its light transmission property even when the concentration of Pr is confined within the aforementioned range The reason for imposing an upper limit of 6.0 $cm^{-1}$ on the linear absorption coefficient at 550 nm is that the fluorescent substance acquires a fully satisfactory luminous emission intensity enough to adapt it for use in a radiation detector so long as the linear absorption coefficient is below the upper limit.

The linear absorption coefficient at 550 nm is desired to be not more than 5.5 $cm^{-1}$ preferably not more than 5.0 $cm^{-1}$.

Then, the fluorescent substance of this invention is made of a composition of the chemical formula, $R_{2(1-x)}Pr_{2x}O_2S$ (wherein R stands for at least one member selected from the group consisting of Y, Gd, La, and Lu and x for a numerical value satisfying the expression, $5 \times 10^{-5} \leq x \leq 1 \times 10^{-2}$), and further is characterized in that the content of $PO_4$ thereof is not more than 100 ppm.

The reason for imposing an upper limit of 100 ppm on the $PO_4$ is that the improvement of the luminous emission intensity aimed at by this invention will not be obtained if the $PO_4$ content in the fluorescent substance exceeds 100 ppm. The content of $PO_4$ is desired to be not more than 50 ppm, preferably not more than 15 ppm.

The method for the production of the fluorescent substance of this invention is characterized by the steps of preparing a powder of a rare earth oxide having a composition of the chemical formula, $R_2O_3$ (wherein R stands for at least one member selected from the group consisting of Y, Gd, La, and Lu), and containing Pr in an amount in the range of from $5 \times 10^{-5}$ to $1 \times 10^{-2}$ mol, mixing the rare earth oxide with S (sulfur), a phosphate represented by the chemical formula, $A_3PO_4$, and a carbonate represented by the chemical formula, $A_2CO_3$ (wherein A stands for at least one member selected from the group consisting of Li, Na, K, Rb, and Cs), then firing the resultant mixture at a temperature in the range of from 1100° C. to 1300° C., washing the fired mixture with an acid and water, and thereafter subjecting the clean fired mixture to a hot isostatic pressing at a temperature of not less than 1400° C. under a pressure of not less than 100 MPa.

The reason for limiting the content of Pr in the fluorescent substance is that the produced fluorescent substance will not produce a fully satisfactory luminous emission if this content departs from this specific range. The temperature and the pressure at the hot isostatic pressing are required to exceed 1400° C. and 100 MPa respectively. Preferably these conditions exceed 1450° C. and 130 MPa.

Since this method of production first fires the fluorescent substance and then washes the fired fluorescent substance, the $PO_4$ which has contributed to induce promoted sintering of the fluorescent substance and is still remaining in the fired fluorescent substance is washed out at the step of washing and, as a result, the $PO_4$ content in the fluorescent substance after the treatment of hot isostatic pressing is low. Conversely, if the treatment of hot isostatic pressing precedes the step of washing, the $PO_4$ remaining in the sinter will not be washed out and, as a result, the amount of $PO_4$ persisting in the sinter will be inevitably large.

The acid to be used for the washing is desired to be hydrochloric acid. It is particularly desirable to use water diluted hydrochloric acid having a concentration in the range of from 5 to 20%. The washing with this acid is required to be repeated a plurality of times. For the removal of the $PO_4$ persisting in the fluorescent substance, it is particularly effective to repeat this washing at least 15 times. For the washing with water, it is desirable to use distilled water. Since the washing with water is intended to remove the acid which remains in the fluorescent substance after the washing with the acid, it generally suffices to make this washing two or three times.

The fluorescent substance of this invention, as a feature, is characterized by being in the form of ceramics.

When the fluorescent substance is a ceramic, it has an advantage in allowing the $PO_4$ persisting therein to be removed therefrom efficiently by the washing.

If the fluorescent substance is in the form of a single crystal, though it may exhibit outstanding characteristic properties for fluorescence, it will be produced only under very difficult conditions. With all the latest techniques, it is difficult to produce stably a rare earth oxysulfide fluorescent substance in a size which is normally required for a radiation detector.

Incidentally, the rare earth oxysulfide fluorescent substance may optionally incorporate therein Ce for the purpose of suppressing the phenomenon of afterglow. In this case, the desired suppression of the afterglow is attained conspicuously by using Ce at a concentration of not less than 10 ppm. The fluorescent substance of this invention, however, is highly efficient without reference to the presence or absence of Ce.

The radiation detector of this invention is characterized by using the fluorescent substance mentioned above. Likewise, the X-ray CT apparatus according to this invention is characterized by using the radiation detector mentioned above.

The fluorescent substance of this invention, as described above, is a rare earth oxysulfide represented by the chemical formula, $R_{2(1-x)}Pr_{2x}O_2S$ (wherein x stands for a numerical value satisfying the expression, $5\times10^{-5} \leq x \leq 1\times10^{-2}$), and by the fact that a linear absorption coefficient at a wavelength of 550 nm is not more than 6.0 $cm^{-1}$. Further, it acquires a notably improved luminous emission intensity as compared with the conventional fluorescent substance because the $PO_4$ content thereof is controlled to an extremely low level. When this fluorescent substance is used particularly in the radiation detector and consequently in the X-ray CT apparatus, it permits improvement of the luminous emission intensity and improvement of the contrast resolution.

DESCRIPTION OF THE PREFERRED EMBODIMENTS

Figure 1:
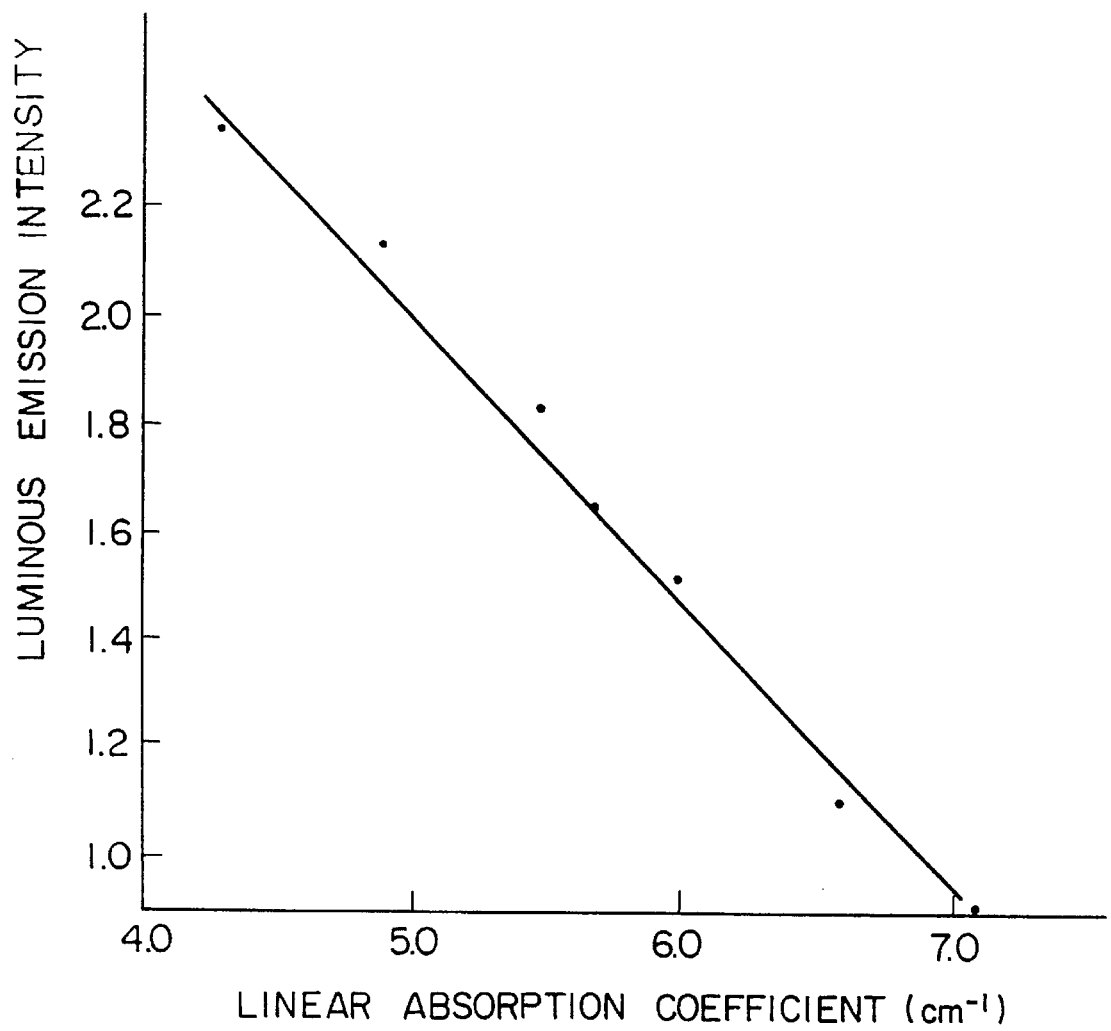
FIG. 1 shows the relationship between the linear absorption coefficients and the luminous emission intensities manifested by a gadolinium oxysulfide ceramics ($Gd_{1.998}Pr_{0.002}O_2S$) at 550 nm.

Now, this invention will be described below with reference to working examples of the invention.

EXAMPLE 1

A mixture of 500 g of a powder of gadolinium oxide containing praseodymium (Pr) at a concentration of 0.1 mol% ($Gd_{1.988}Pr_{0.002}O_3$) with 75 g of sulfur (S), 100 g of sodium phosphate, and 100 g of sodium carbonate was placed in a quartz vessel and fired in an electronic furnace at 1150° C. for five hours.

The resultant fired mixture was gradually cooled to room temperature and then washed five times with 1 liter of diluted hydrochloric acid of a concentration of 10%. It was further washed twice with 1 liter of distilled water.

The resultant fluorescent substance which had undergone the washing with the acid and water was dried, then molded with a rubber press, hermetically sealed with a capsule made of tantalum (Ta), and set in place in a hot isostatic pressing device. In the device, the capsuled fluorescent substance was treated under 147 MPa and 1500° C. for five hours in Ar gas atomosphere.

A rodlike sample measuring 1.0×1.8×20.0 mm was cut from the sintered fluorescent substance obtained as described above and tested for characteristic properties. For this test, the sample was applied fast with optical grease on a photodiode possessed of a sensitive part 1.0 ×20.0 mm in area and a reflecting agent was applied to the remaining surfaces of the sample. As a result, the surfaces of the sample except the surface adjoining the diode are shaded so that the light emitted from the fluorescent substance impinges exclusively on the photodiode.

As a reference standard sample, a sample identical in shape and size with the sample mentioned above was cut from a $CdWO_4$ single crystal and used.

Further a rodlike sample measuring 1.0×1.8×20.0 mm was cut from the same sintered fluorescent substance as mentioned above, and with the surfaces of the sample polished until specular finish, heat-treated in an atmosphere of $N_2$ gas at 380° C. for ten hours, and then tested for diffusion spectral transmittance at 550 nm in the direction of 1.8 mm. In this case, the linear absorption coefficient was calculated in accordance with the following formulas.

$$T = I/I_0 = (1-R)^2 \exp(-\alpha t)$$

$$R = [(n-1)/(n+1)]^2$$

wherein T stands for the diffused spectral transmittance, n for the refractive index of a given sample at 550 nm, t for the thickness (cm) of the sample, and $\alpha$ for the linear absorption coefficient ($cm^{-1}$).

The gadolinium oxysulfide fluorescent substance obtained in Example 1 was found to have a refractive index n of 2.3 at 550 nm. Thus, R of this sample is found by calculation to be 0.155. Based on the data, T (diffused spectral transmittance) =0.199 and t (thickness of the sample)=0.18 cm, the linear absorption coefficient, $\alpha$, of this sample is found to be 7.1 $cm^{-1}$.

The $PO_4$ content in the gadolinium oxysulfide fluorescent substance of Example 1 was 277 ppm.

The luminous emission intensity of the fluorescent substance obtained in Example 1 was found to be 0.91, relative to the luminous emission intensity of the reference standard sample cut out of the $CdWO_4$ single crystal.

EXAMPLES 2 to 7

Samples of Examples 2, 3, 4, 5, 6, and 7 were produced by repeating the procedure of Example 1 while changing the number of cycles of acid washing given to a fluorescent substance obtained by firing in the process of Example 1 respectively to 10, 15, 20, 25, 30, and 35 times. The samples were subjected to the same test as mentioned above.

The results of the test are shown together with those of the sample of Example 1 below.

TABLE 1

| EX-AMPLE No. | Number of cycles of acid washing | Linear absorption coefficient ($cm^{-1}$) | $PO_4$ content (ppm) Before hot isostatic pressing | After hot isostatic pressing | Luminous emission intensity |
|---|---|---|---|---|---|
| 1 | 5 | 7.1 | 277 | 263 | 0.91 |
| 2 | 10 | 6.6 | 187 | 175 | 1.10 |
| 3 | 15 | 6.0 | 83 | 79 | 1.52 |
| 4 | 20 | 5.7 | 65 | 63 | 1.65 |
| 5 | 25 | 5.5 | 41 | 39 | 1.83 |
| 6 | 30 | 4.9 | 22 | 21 | 2.13 |
| 7 | 35 | 4.3 | 12 | 9 | 2.35 |
| Standard | | | | | 1.00 |

Note) "Before hot isostatic pressing" denotes the $PO_4$ content in the powdered fluorescent substance after the above mentioned washing process.

Figure 2:
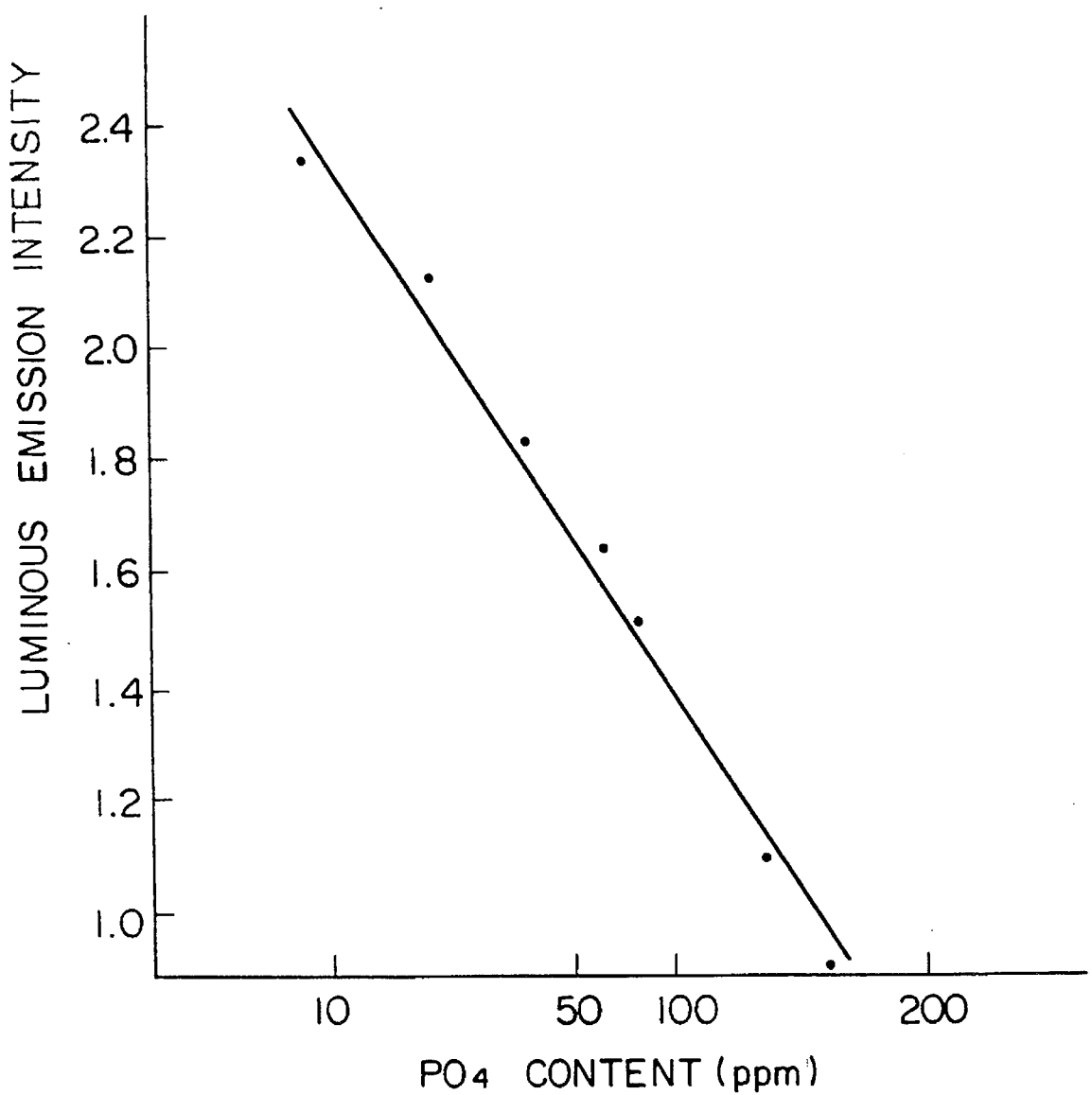
FIG. 2 shows the relationship between the $PO_4$ contents and the luminous emission intensities obtained of the gadolinium oxysulfide ceramics ($Gd_{1.998}Pr_{0.002}O_2S$) at 550 nm.

From the data of Table 1 were derived the relationship between the linear absorption coefficient at 550 nm and the luminous emission intensities of each of the gadolinium oxysulfide ceramics ($Gd_{1.998}PR_{0.002}O_2S$) obtained in Examples 1 to 7 and the relationship between the $PO_4$ content and the luminous emission intensities of each of the gadolinium oxysulfide ceramics. These relationships are shown in FIG. 1 and FIG. 2 respectively. It is remarked from FIG. 1 and FIG. 2 that the luminous emission intensities increase substantially linearly with the decrease of the linear absorption coefficient at 550 nm of the gadolinium oxysulfide ceramics and that the luminous emission intensities increase substantially linearly with the decrease of the $PO_4$ content in the ceramics.

EXAMPLES 8 to 15

Samples were produced by repeating the procedure of Example 1 while changing the amount of praseodymium respectively to 0.01, 0.03, 0.20, and 0.30 mol% ($1\times10^{-4}$, $3\times10^{-4}$, $2\times10^{-3}$, and $3\times10^{-3}$). In Examples 8, 10, 12, and 14, the samples were subjected to 10 cycles of acid washing. In Examples 9, 11, 13, and 15, the samples were subjected to 20 cycles of acid washing. The results are shown in Table 2.

TABLE 2

| Example No. | Pr concentration (mol %) | Number of cycles of washing | Linear absorption coefficient ($cm^{-1}$) | $PO_4$ content (ppm) During firing | After hot isostatic pressing | Luminous emission intensity |
|---|---|---|---|---|---|---|
| 8 | 0.01 | 10 | 6.4 | 137 | 130 | 0.83 |
| 9 | 0.01 | 20 | 5.5 | 43 | 41 | 1.07 |
| 10 | 0.03 | 10 | 6.4 | 148 | 139 | 1.12 |
| 11 | 0.03 | 20 | 5.5 | 46 | 42 | 1.43 |
| 12 | 0.20 | 10 | 6.5 | 156 | 147 | 1.03 |
| 13 | 0.20 | 20 | 5.6 | 51 | 47 | 1.35 |
| 14 | 0.30 | 10 | 6.3 | 126 | 122 | 0.91 |
| 15 | 0.30 | 20 | 5.4 | 38 | 35 | 1.22 |

EXAMPLES 16 and 17

Samples were produced by following the procedure of Example 1 while using a powder of yttrium oxide containing praseodymium at a concentration of 0.1 mol% ($1\times10^{-3}$) ($Y_{1.998}Pr_{0.002}O_3$) instead. The number of cycles of acid washing was 10 in Example 16 and 20 in Example 17. The results are shown in Table 3.

EXAMPLES 18 and 19

Samples were produced by following the procedure of Example 1 while using a powder of gadolinium lanthanum lutetium oxide containing praseodymium at a concentration of 0.1 mol% ($1\times10^{-3}$) ($Gd_{1.598}La_{0.20}Lu_{0.20}Pr_{0.002}O_3$) instead. The number of cycles of acid washing was 10 in Example 18 and 20 in Example 19.

The results are shown additionally in Table 3.

TABLE 3

| Example No. | Number of cycles of washing | Linear absorption coefficient ($cm^{-1}$) | $PO_4$ content (ppm) During firing | After hot isostatic pressing | Luminous emission intensity |
|---|---|---|---|---|---|
| 16 | 10 | 6.3 | 154 | 146 | 1.31 |
| 17 | 20 | 5.9 | 45 | 39 | 1.58 |
| 18 | 10 | 6.5 | 139 | 132 | 1.25 |
| 19 | 20 | 5.6 | 32 | 27 | 1.73 |

EXAMPLES 20 to 22

Samples were produced by following the procedure of Example 1 while using a powder of gadolinium having part thereof substituted by cerium and containing praseodymium at a concentration of 0.1 mol ($1\times10^{-3}$) ($Gd_{1.99795}Pr_{0.00200}Ce_{0.00005}O_3$) instead. The number of cycles of acid washing was 10 in Example 20, 20 in Example 21, and 30 in Example 22. The results are shown in Table 4.

TABLE 4

| Example No. | Number of cycles of washing | Linear absorption coefficient (cm$^{-1}$) | PO$_4$ content (ppm) | | Luminous emission intensity |
|---|---|---|---|---|---|
| | | | During firing | After hot isostatic pressing | |
| 20 | 10 | 6.5 | 173 | 168 | 0.95 |
| 21 | 20 | 5.8 | 72 | 65 | 1.45 |
| 22 | 30 | 5.0 | 25 | 23 | 1.98 |

It is remarked from Tables 1 to 4 that the samples containing fluorescent substances having linear absorption coefficients of not more than 6.0 cm$^{-1}$ at 550 nm possess higher luminous emission intensities than the standard sample (CdWO$_4$). It is also noted from Table 1 that the samples containing fluorescent substances having Pr contents in a preferred range possessed luminous emission intensities more than 1.5 times the luminous emission intensity of the standard sample. It is further noted that the samples containing fluorescent substances having PO$_4$ contents of not more than 100 ppm possess higher luminous emission intensities than the luminous emission intensity of the standard sample. The luminous emission intensities were not less than 2.0 times the luminous emission intensity of the standard sample when the PO$_4$ contents were not more than 15 ppm.

The samples of (Gd$_{1.99795}$Pr$_{0.00200}$Ce$_{0.00005}$O$_3$) of Examples 20 to 22 containing a minute amount of cerium as a substituent possessed luminous emission intensities equal to the luminous emission intensities of the samples of Examples 1 to 7 containing no cerium as a substituent and exhibited degrees of afterglow roughly one tenth of the degrees exhibited by the samples of Examples 1 to 7 owing to the addition of cerium.

As described above, the rare earth oxysulfide fluorescent substance which is produced by this invention has a small linear absorption coefficient and, therefore, manifests an ample luminous emission.

Further, this invention permits production of a fluorescent substance possessing an amply high luminous emission intensity because it allows the enough low PO$_4$ content in the luminous substance without any sacrifice of crystallinity or sintering property.

The X-ray CT apparatus which employs a radiation detector using the fluorescent substance of the present invention enjoys improved contrast resolution and exalted operational accuracy owing to the ample luminous emission intensity of the fluorescent substance.

What is claimed is:

1. A fluorescent substance comprising a rare earth oxysulfide represented by the chemical formula R$_{2(1-x)}$Pr$_{2x}$O$_2$S, wherein R stands for at least one member selected from the group consisting of Y, Gd, La, and Lu and x for a numerical value satisfying the expression, $5 \times 10^{-5} \leq x \leq 1 \times 10^{-2}$, and containing a measurable amount of PO$_4$ not exceeding 15 ppm.

2. A fluorescent substance according to claim 1, wherein said fluorescent substance is a ceramic.

3. A fluorescent substance according to claim 1, wherein the numerical value of x satisfies the expression, $1 \times 10^{-4} \leq x \leq 5 \times 10^{-3}$.

4. A radiation detector comprising a scintillator, said scintillator comprising a fluorescent substance according to claim 1.

5. An X-ray CT apparatus comprising a radiation detector comprising a scintillator, said scintillator comprising a fluorescent substance according to claim 1.

6. A method for the production of a fluorescent substance characterized by the steps of:

mixing a powder of a rare earth oxide represented by the chemical formula, R$_2$O$_3$, and containing Pr in an amount in the range of from $5 \times 10^{-5}$ to $1 \times 10^{-2}$ mol with sulfur (S), a phosphate represented by the chemical formula, A$_3$PO$_4$, and a carbonate represented by the formula, A$_2$CO$_3$, so as to form a mixture containing a rare earth oxysulfide composition represented by the chemical formula, R$_{2(1-x)}$Pr$_{2x}$O$_2$S, firing said mixture at a temperature in the range of from 1100° C. to 1300° C. thereby mainly forming a fired substance of a rare earth oxysulfide represented by the chemical formula, R$_{2(1-x)}$Pr$_{2x}$O$_2$S, washing said fired substance with an acid and water, and subjecting said washed material to hot isostatic pressing at a temperature of not less than 1400° C. under a pressure of not less than 100 MPa thereby forming a rare earth oxysulfide ceramic containing PO$_4$ in an amount not more than 15 ppm, wherein R stands for at least one member selected from the group consisting of Y, Gd, La and Lu and A for at least one member selected from the group consisting of Li, Na, K, Rb, and Cs, and x satisfies the expression, $1 \times 10^{-5} \leq x \leq 5 \times 10^{-2}$.

7. A method according to claim 6, wherein said washing with an acid is implemented by use of a dilute hydrochloric acid having a concentration in the range of from 5 to 20%.

8. A method according to claim 6, wherein said washing with an acid is repeated a total of not less than 15 times.

* * * * *

UNITED STATES PATENT AND TRADEMARK OFFICE
CERTIFICATE OF CORRECTION

PATENT NO. : 5,609,793
DATED : March 11, 1997
INVENTOR(S) : Kazuto YOKOTA et al.

It is certified that error appears in the above-indentified patent and that said Letters Patent is hereby corrected as shown below:

Claim 3, Column 8, Lines 12-13, "$1 \times 10_4^- \leq x \leq 5 \times 10^{-3}$" should read --$1 \times 10^{-4} \leq x \leq 5 \times 10^{-3}$--.

Signed and Sealed this

Twenty-sixth Day of August, 1997

Attest:

BRUCE LEHMAN

Attesting Officer

Commissioner of Patents and Trademarks